(12) United States Patent
Smith et al.

(10) Patent No.: US 12,539,462 B2
(45) Date of Patent: Feb. 3, 2026

(54) SYSTEMS AND METHODS FOR EXECUTING FEEDBACK SIGNATURES ON A SECOND SCREEN DEVICE TO CONVEY OCCURRENCES OF EVENTS IN CONNECTION WITH A VIDEO GAME

(71) Applicant: Netflix, Inc., Los Gatos, CA (US)

(72) Inventors: James Smith, Los Gatos, CA (US);
Olivier Jean Poitrey, Le Chesnay (FR);
Chase Rubin Meusel, Woodbury, MN (US)

(73) Assignee: Netflix, Inc., Los Gatos, CA (US)

( * ) Notice: Subject to any disclaimer, the term of this patent is extended or adjusted under 35 U.S.C. 154(b) by 292 days.

(21) Appl. No.: 18/193,625

(22) Filed: Mar. 30, 2023

(65) Prior Publication Data

US 2024/0325899 A1 Oct. 3, 2024

(51) Int. Cl.
| | |
|---|---|
| *A63F 13/537* | (2014.01) |
| *A63F 13/285* | (2014.01) |
| *A63F 13/54* | (2014.01) |
| *G06F 3/01* | (2006.01) |
| *G06F 3/16* | (2006.01) |

(52) U.S. Cl.
CPC .......... *A63F 13/537* (2014.09); *A63F 13/285* (2014.09); *A63F 13/54* (2014.09); *G06F 3/016* (2013.01); *G06F 3/167* (2013.01)

(58) Field of Classification Search
CPC ...... A63F 13/537; A63F 13/285; A63F 13/54; G06F 3/016; G06F 3/167
See application file for complete search history.

(56) References Cited

U.S. PATENT DOCUMENTS 11,870,585 B1 1/2024 Tayloe et al.
2001/0045941 A1* 11/2001 Rosenberg .............. A63F 13/23
345/161
(Continued)

FOREIGN PATENT DOCUMENTS

EP 1768346 A1 3/2007
KR 20180042580 4/2018
(Continued)

OTHER PUBLICATIONS

"How to change the notification settings in Windows", Dec. 10, 31, 2020, retrieved from https://www.computerhope.com/issues/ch00177.htm; 10 pages.

(Continued)

*Primary Examiner* — Steve Rowland
(74) *Attorney, Agent, or Firm* — Greenberg Traurig, LLP

(57) ABSTRACT

The disclosed computer-implemented methods and systems can generate and implement feedback signatures including feedback signals that can convey—on a display screen device—the occurrence of a particular event relative to a video game. For example, the disclosed methods and systems can generate feedback signatures including combinations of visual feedback signals, auditory feedback signals, and/or haptic feedback signals. The disclosed methods can further modify generated feedback signatures such that the feedback signatures are specifically tailored to the capabilities of the display screen device and the preferences of the video game player. Various other methods, systems, and computer-readable media are also disclosed.

20 Claims, 5 Drawing Sheets

(56) References Cited

U.S. PATENT DOCUMENTS

| | | | |
|---|---|---|---|
| 2004/0160415 A1* | 8/2004 | Rosenberg | G05G 9/047 |
| | | | 345/156 |
| 2005/0014561 A1* | 1/2005 | Ouchi | A63F 13/285 |
| | | | 463/36 |
| 2008/0294984 A1* | 11/2008 | Ramsay | H04M 1/72448 |
| | | | 715/702 |
| 2009/0085882 A1* | 4/2009 | Grant | G06F 1/1626 |
| | | | 345/173 |
| 2009/0184921 A1* | 7/2009 | Scott | G06F 1/1626 |
| | | | 345/156 |
| 2010/0194547 A1* | 8/2010 | Terrell | A63F 13/24 |
| | | | 340/407.1 |
| 2011/0256930 A1* | 10/2011 | Jaouen | A63F 13/803 |
| | | | 463/37 |
| 2012/0319938 A1* | 12/2012 | Gervais | G06F 3/016 |
| | | | 340/407.1 |
| 2014/0198130 A1* | 7/2014 | Lacroix | G06F 3/016 |
| | | | 345/633 |
| 2014/0232657 A1* | 8/2014 | Aviles | G06F 9/541 |
| | | | 345/173 |
| 2014/0315642 A1* | 10/2014 | Grant | A63F 13/285 |
| | | | 345/184 |
| 2014/0320435 A1* | 10/2014 | Modarres | G06F 1/1652 |
| | | | 345/173 |
| 2015/0177837 A1* | 6/2015 | Yliaho | G06F 3/016 |
| | | | 715/702 |
| 2015/0182856 A1* | 7/2015 | Mays, III | G06F 3/0488 |
| | | | 463/31 |
| 2015/0268725 A1* | 9/2015 | Levesque | G06F 3/041 |
| | | | 345/156 |
| 2015/0293592 A1* | 10/2015 | Cheong | G06F 1/163 |
| | | | 345/173 |
| 2018/0011538 A1* | 1/2018 | Rihn | G06F 3/016 |
| 2019/0149637 A1 | 5/2019 | Howell | |
| 2019/0235627 A1* | 8/2019 | Klein | G06F 3/04883 |
| 2019/0235753 A1* | 8/2019 | Lou | G06F 21/6281 |
| 2021/0113927 A1 | 4/2021 | Zimring et al. | |
| 2021/0402292 A1* | 12/2021 | Chow | A63F 13/79 |
| 2022/0080299 A1 | 3/2022 | Huang et al. | |
| 2022/0291822 A1 | 9/2022 | Wheeler et al. | |
| 2024/0419263 A1* | 12/2024 | Stoeckli | G06F 3/0362 |
| 2025/0110574 A1* | 4/2025 | Alonso | G06F 3/04847 |
| 2025/0112008 A1* | 4/2025 | Lin | G06F 3/0202 |

FOREIGN PATENT DOCUMENTS

| | | |
|---|---|---|
| KR | 20180042580 A | 4/2018 |
| WO | 2020226229 A1 | 12/2020 |

OTHER PUBLICATIONS

"Sound—Win32 apps / Microsoft Learn", Jun. 3, 2021, retrieved from https://learn.microsoft.com/en-us/windows/win32/uxguide/vis-sound; 12 pages.

International Search Report and Written Opinion for International Application No. PCT/US2024/022104, dated Jul. 15, 2024; 11 pages.

United States Non-Final Office Action for U.S. Appl. No. 18/193,615, mailed Mar. 21, 2025; 13 pages.

United States Non-Final Office Action for U.S. Appl. No. 18/193,620, mailed Apr. 2, 2025; 22 pages.

United States Non-Final Office Action for U.S. Appl. No. 18/193,622, mailed May 15, 2025; 13 pages.

United States Non-Final Office Action for U.S. Appl. No. 18/193,626, mailed Apr. 11, 2025; 12 pages.

"Real-time Multiplayer Software Architecture"; Olli Vilmi; Mar. 13, 2020; 59 pages.

"DroidJoy Server Tutorial"—https://github.com/grill2010/DroidJoy_Server/wiki/DroidJoy-Server-Tutorial.

"How To Emulate Or Use Android Device As A Gamepad For Windows—DroidJoy Tutorial—Easy Method" https://www.youtube.com/watch?v=cd6ErGFy0Js.

United States Non-Final Office Action for U.S. Appl. No. 18/193,626, mailed Oct. 22, 2025; 10 pages.

United States Non-Final Office Action for U.S. Appl. No. 18/193,622, mailed Sep. 8, 2025; 11 pages.

United States Final Office Action for U.S. Appl. No. 18/193,620, mailed Aug. 1, 2025; 21 pages.

\* cited by examiner

SYSTEMS AND METHODS FOR EXECUTING FEEDBACK SIGNATURES ON A SECOND SCREEN DEVICE TO CONVEY OCCURRENCES OF EVENTS IN CONNECTION WITH A VIDEO GAME

BACKGROUND

Video games continue to be a popular and pervasive form of entertainment. Video gaming platforms constantly try to create video games that are faster, more exciting, and more immersive. Typically, a video game is played on a game console or computer that displays game graphics via a display device such as a TV or monitor, while a player interacts with the displayed game via a physical controller or other input device. Video game controllers generally include a collection of physical buttons, joysticks, track pads, paddles, and so forth.

In some instances, a video game may include buttons and other control elements that are displayed on a display screen device. For example, some video games may include interactive game control elements that are displayed on a touch screen display of a smartphone. Unfortunately, displayed (as opposed to physical) video game control elements can be difficult to use. To illustrate, players sometimes find it difficult to correctly interact with displayed video game control elements because the displayed buttons, joysticks, etc. fail to provide users with a physical sense of when one button or control ends and another begins, when a particular button has been selected (e.g., the "A" button as opposed to the "X" button), etc. As such, players often have difficulty knowing when or whether they have hit the right button or other control element because their attention is focused on the video game.

Additionally, while a player's attention is focused on the video game other changes may occur that the player can easily miss. For example, the display screen device that the player is using as a video game controller may become disconnected from the gaming platform or may run low on battery power. It may take the player several moments to notice that the display screen device has stopped functioning correctly.

Missed game control element interactions and other unobserved changes can lead to various inaccuracies. For example, a gaming system may fail to correctly advance game play when a player misses hitting a particular displayed video game control element or when the player's display screen device disconnects. Additionally, a gaming system may incorrectly advance game play when a player misses an intended displayed video game control element and rather hits an unintended displayed video game control element.

SUMMARY

As will be described in greater detail below, the present disclosure describes implementations that generate and implement feedback signatures that cause a display screen device to execute combinations of feedback signals in connection with a video game. For example, implementations can include generating a feedback signature that conveys, using a specific combination of feedback signals, an occurrence of a particular event in connection with a video game, detecting the occurrence of the particular event, determining one or more characteristics of a display screen device that functions as a game controller for the video game, modifying, based at least in part on the one or more characteristics of the display screen device, the specific combination of feedback signals to tailor the feedback signature to the display screen device, and causing the display screen device to execute the specific combination of feedback signals included with the tailored feedback signature to convey the occurrence of the particular event.

In some examples, the specific combination of feedback signals can include at least one of visual feedback signals, auditory feedback signals, or haptics feedback signals. Additionally, the one or more characteristics of the display screen device can include at least one of a display resolution of the display screen device, a minimum audio fidelity level of the display screen device, or a minimum vibration motor duration of the display screen device.

In some examples, tailoring the feedback signature to the display screen device can include at least one of modifying visual feedback signals in the feedback signature based on the display resolution of the display screen device, modifying auditory feedback signals in the feedback signature based on the minimum audio fidelity level of the display screen device, or modifying haptics feedback signals in the feedback signature based on the minimum vibration motor duration of the display screen device. Additionally, the specific combination of feedback signals may be associated with at least one of an input feedback category, an informative feedback category, or an immersive feedback category.

Some implementations can further include causing the display screen device to prioritize execution of the specific combination of feedback signals based on an associated feedback category. Additionally, in some implementations the specific combination of feedback signals includes one or more differences from combinations of feedback signals used by other feedback signatures in the same feedback category such that a player can distinguish between events in the same feedback category without having to focus on the display screen device. Furthermore, some implementations can further include receiving at least one feedback signal customization request, where modifying the specific combination of feedback signals can include modifying the specific combination of feedback signals based at least in part on the at least one feedback signal customization request.

Some examples described herein include a system with at least one physical processor and physical memory including computer-executable instructions that, when executed by the at least one physical processor, cause the at least one physical processor to perform various acts. In at least one example, the computer-executable instructions, when executed by the at least one physical processor, cause the at least one physical processor to perform acts including generating a feedback signature that conveys, using a specific combination of feedback signals, an occurrence of a particular event in connection with a video game, detecting the occurrence of the particular event, determining one or more characteristics of a display screen device that functions as a game controller for the video game, modifying, based at least in part on the one or more characteristics of the display screen device, the specific combination of feedback signals to tailor the feedback signature to the display screen device, and causing the display screen device to execute the specific combination of feedback signals included with the tailored feedback signature to convey the occurrence of the particular event.

In some examples, the above-described method is encoded as computer-readable instructions on a computer-readable medium. In one example, the computer-readable instructions, when executed by at least one processor of a computing device, cause the computing device to generate a feedback signature that conveys, using a specific combination of feedback signals, an occurrence of a particular event in connection with a video game, detect the occurrence of the particular event, determine one or more characteristics of a display screen device that functions as a game controller for the video game, modify, based at least in part on the one or more characteristics of the display screen device, the specific combination of feedback signals to tailor the feedback signature to the display screen device, and cause the display screen device to execute the specific combination of feedback signals included with the tailored feedback signature to convey the occurrence of the particular event.

In one or more examples, features from any of the embodiments described herein are used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the present disclosure.

Figure 1:
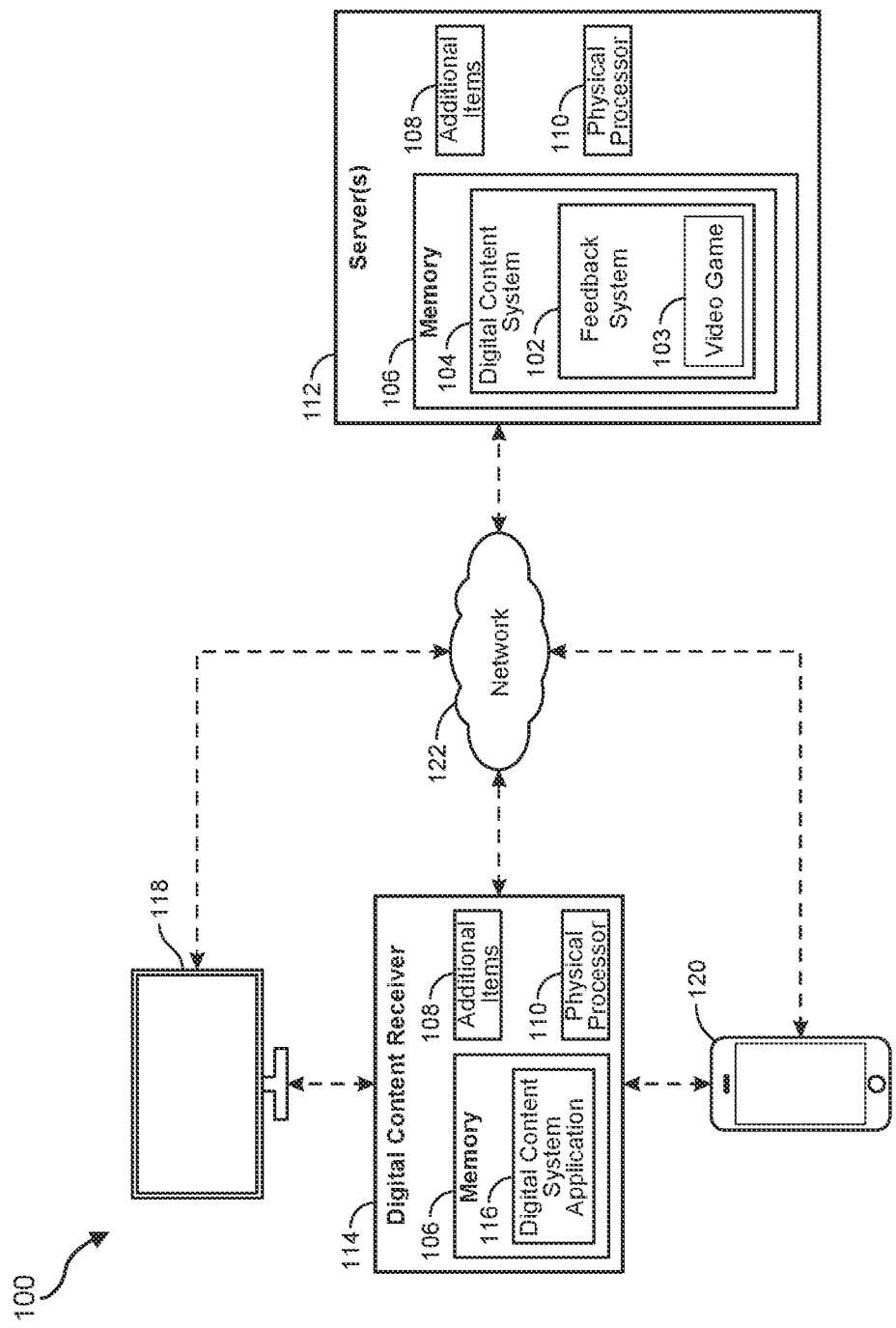
FIG. 1 is a block diagram of an exemplary environment for implementing a feedback system in accordance with one or more implementations.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the present disclosure covers all modifications, equivalents, and alternatives falling within the scope of the appended claims.

DETAILED DESCRIPTION OF EXEMPLARY EMBODIMENTS

As mentioned above, video game graphics can be attention-grabbing to the point that players may miss important changes in connection with the video game or may struggle to correctly interact with displayed video game control elements (e.g., such as buttons displayed on a smartphone used as a video game controller). These difficulties may give rise to various interaction inaccuracies and overall dissatisfaction with the video game. For example, players may either entirely miss a displayed video game control element or may interact with the wrong video game control element because they cannot feel the location of that video game control element with their fingers while simultaneously focusing on video game graphics. Additionally, changes may occur in connection with the video game (e.g., network connection problems, control element layout changes, etc.) that are entirely missed by the player due to a lack of noticeable feedback associated with the changes. Missed changes and incorrect video game control element interactions can lead to failed or inaccurate gameplay which—in turn—can result in resource waste as network resources are used to transmit incorrect data, incorrect game graphics are rendered, gameplay is restarted, and so forth.

In light of these problems, the present disclosure describes a system that generates and implements feedback signatures that provide various types of visual, auditory, and haptic feedback related to 1) user interactions with displayed video game control elements, such as on-screen buttons and other controls, 2) changes associated with a video game, and 3) overall game play experience. For example, the disclosed system can generate feedback signatures associated with various events that can occur in connection with a video game, such as when a particular on-screen button has been pressed, when a display screen device has lost connection or is running low on charge, etc. Each feedback signature can use a specific combination of visual, auditory, and/or haptic feedback signals to convey that a particular event has occurred. For example, a feedback signature for the "A" button may specify that the display screen device should play a particular sound (e.g., a click sound), flash a specific color (e.g., green), and/or vibrate at a particular intensity for a predetermined duration using a specific vibration pattern (e.g., a sine wave) every time the "A" button is selected. In contrast, a feedback signature for the "B" button may specify that the display screen device should play a different sound (e.g., a bell sound), flash a specific color (e.g., red), and/or vibrate at a different intensity for a different duration using a different vibration pattern (e.g., a square wave) every time the "B" button is selected. In one or more implementations, as will be described in greater detail below, the disclosed systems can further modify generated feedback signatures such that a feedback signature becomes tailored to the capabilities of a display screen device and the preferences of the player using that device prior to causing the display screen device to execute the feedback signature.

In this way, the disclosed system avoids many of the problems discussed above that result from lack of noticeable feedback in connection with a video game. For example, the feedback signatures generated by the disclosed system can noticeably inform a player that a particular on-screen button (e.g., the "A" button, as opposed to the "B" button) has been selected, that a displayed joystick has reached the limit of how far it can be pushed to one side, that the display screen device that is being used as a video game controller has become disconnected from the gaming system, that a layout of displayed video game control elements has changed, that the player's video game character has received damage, that an explosion has occurred in the video game, and more. In one or more implementations, the disclosed systems can cause the display screen device to execute the generated feedback signatures in a way that informs the player of any of these occurrences-without requiring the player to look away from the video game graphics being displayed on a first screen device such as a TV. As such, the disclosed system helps the player to correctly interact with video game control elements and to know when changes associated with the video game have occurred. This—in turn—generates computational efficiencies relative to the video game as the system is able to correctly advance game play.

Features from any of the implementations described herein may be used in combination with one another in accordance with the general principles described herein. These and other implementations, features, and advantages will be more fully understood upon reading the following detailed description in conjunction with the accompanying drawings and claims.

Figure 2:
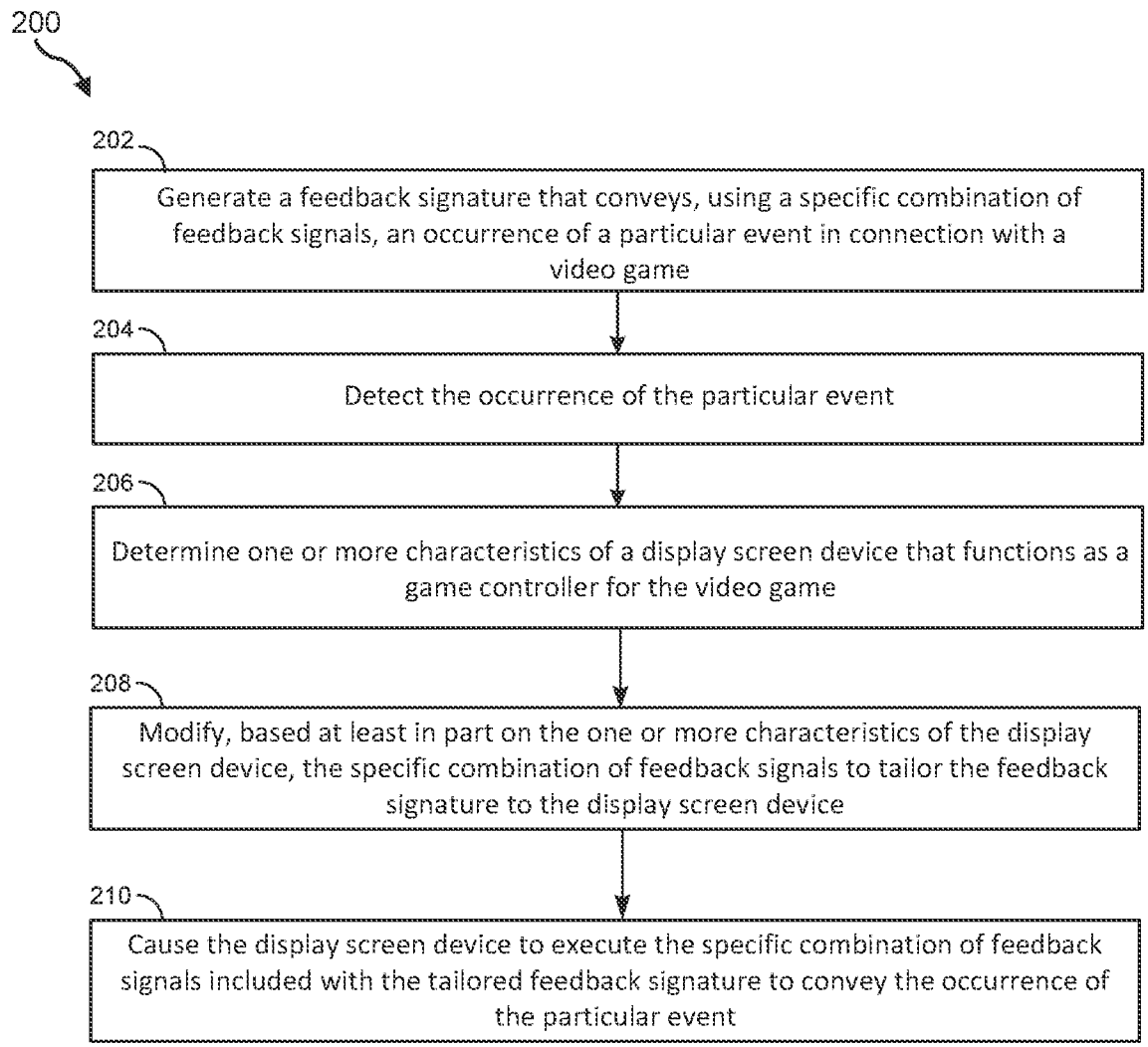
FIG. 2 is a flow diagram of an exemplary computer-implemented method for generating a feedback signature that conveys the occurrence of a particular video game related event in accordance with one or more implementations.
Figure 3A:
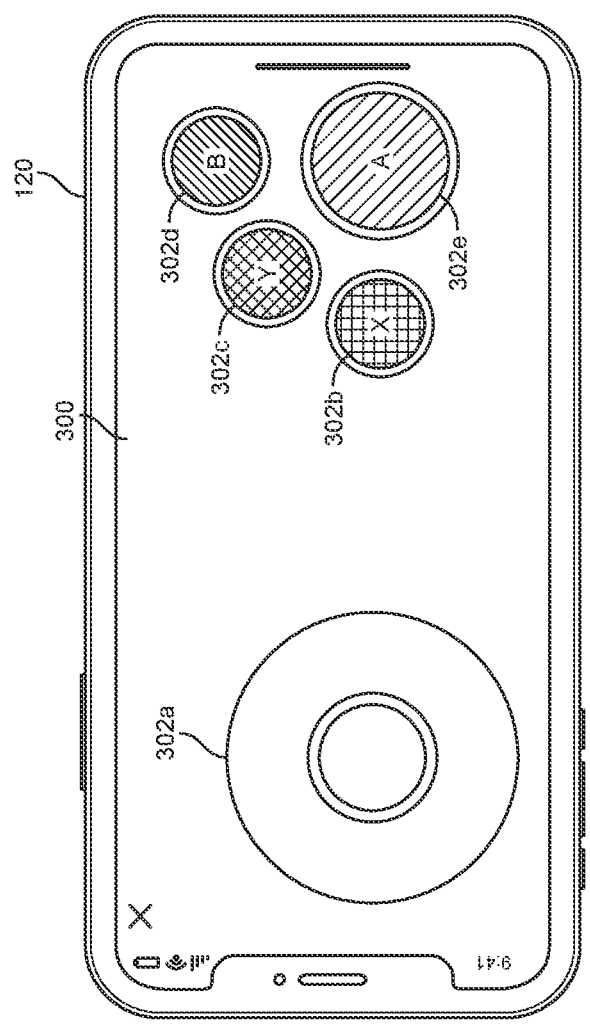
FIGS. 3A and 3B illustrate a display screen device in connection with the feedback system in accordance with one or more implementations.
Figure 3B:
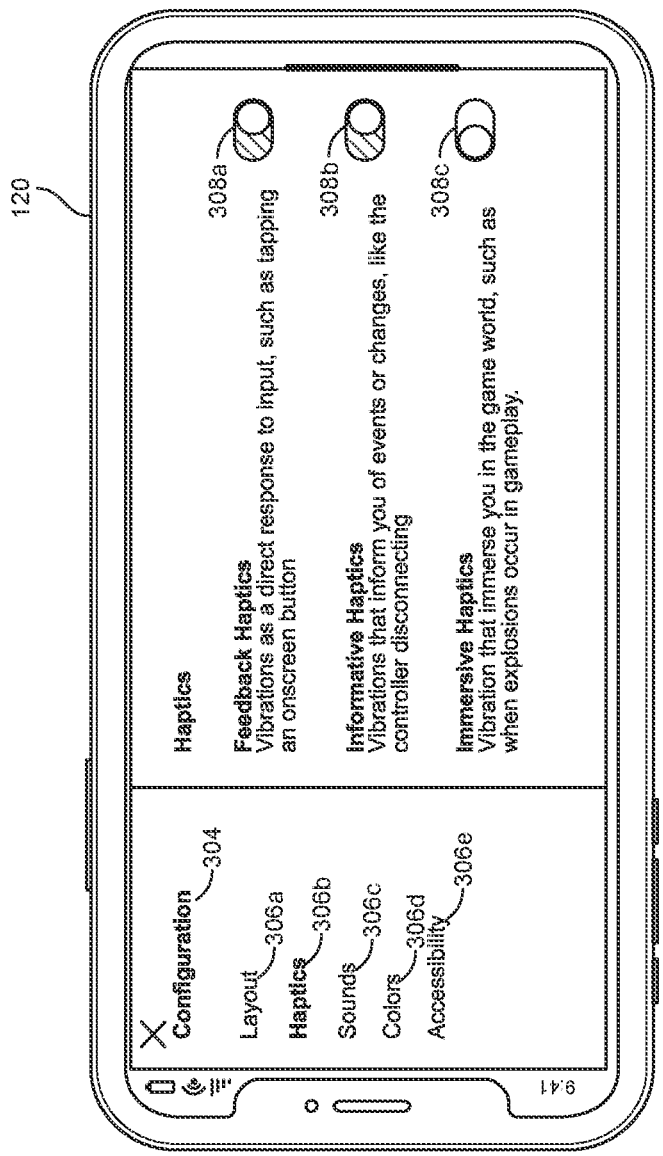
Figure 4:
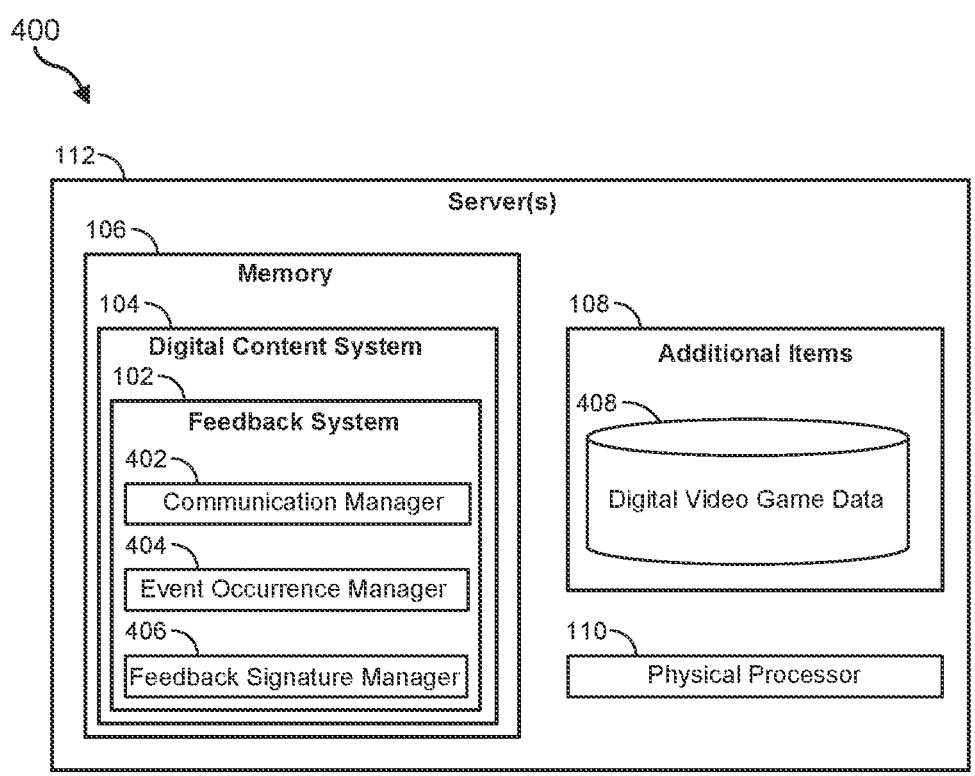
FIG. 4 is a detailed diagram of the feedback system in accordance with one or more implementations.

The following will provide, with reference to FIGS. 1-4, detailed descriptions of a feedback system that generates and executes feedback signatures that convey the occurrence of particular events. For example, an exemplary network environment is illustrated in FIG. 1 to show the feedback system operating in connection with a first screen device and a second screen device. FIG. 2 illustrates steps taken by the feedback system while causing a feedback signature to execute on a display screen device to convey the occurrence of an event in connection with a video game. FIGS. 3A and 3B illustrate a second screen device in connection with the feedback system. Finally, FIG. 4 provides additional detail with regard to the features and functionality of the feedback system.

As just mentioned, FIG. 1 illustrates an exemplary networking environment 100 implementing aspects of the present disclosure. For example, the networking environment 100 can include server(s) 112, a digital content receiver 114, a first screen device 118, a second screen device 120, and a network 122. As further shown, the server(s) 112 and the digital content receiver 114 can include a memory 106, additional items 108, and a physical processor 110.

In one or more implementations, as shown in FIG. 1, the first screen device 118 may be a television and the second screen device 120 may be a display screen device such as a smartphone. In some examples, the display of the second screen device 120 is a touch screen display that may serve as a controller for the video game 103 displayed on the first screen device 118. As further shown, the digital content receiver 114 may be a device that is separate from the first screen device 118 and the second screen device 120, and the first screen device 118 may be physically separate from the second screen device 120. In this implementation, the digital content receiver 114, the first screen device 118, and the second screen device 120 may be on the same subnet (e.g., within the same residence or location), or may be on different subnets. In additional implementations, the digital content receiver 114 and/or the functionality of the digital content receiver 114 may be incorporated into the first screen device 118 and/or the second screen device 120. In yet additional implementations, the first screen device 118 may be a digital projector, monitor, or other display device. Similarly, the second screen device 120 may be a tablet computer or a smart wearable device with an interactive display screen.

As further shown in FIG. 1, a feedback system 102 may be implemented as part of a digital content system 104 within the memory 106 on the server(s) 112. In one or more implementations, the digital content system 104 may include a subscription streaming service for providing digital media content subscribers. Additionally, the feedback system 102 (alone or in combination with the digital content system 104 and/or the video game 103) may access the video game 103, run the video game 103, stream output from the video game 103 to one or both of the first screen device 118 and the second screen device 120 (e.g., to cause the first screen device 118 to render game graphics, to cause the second screen device 120 to display video game control elements such as buttons, joysticks, etc.), receive control inputs from a video game controller (e.g., such as the second screen device 120), etc. In one or more implementations, the video game 103 can analyze control inputs, change game states, update game graphics based on the inputs, while the feedback system 102 works in concert with the video game 103 to detect occurrences of various events, and generate and implement feedback signatures on the second screen device 120.

As further shown in FIG. 1, the digital content receiver 114 may include a digital content system application 116 within the memory 106. In some implementations, the digital content system application 116 may communicate information to and from the digital content system 104 via the network 122. In at least one implementation, the feedback system 102—in concert with the video game 103—may access and utilize data received by the digital content system 104 in generating and implementing feedback signatures.

In some implementations, the digital content system application 116 may be additionally installed on the first screen device 118 and/or the second screen device 120. For example, in one implementation, the first screen device 118 may receive video game display information via the digital content receiver 114 and the second screen device 120 may communicate directly with the server(s) 112 via an additional instance of the digital content system application 116 installed thereon. For example, the digital content system application 116 may be embedded on the second screen device 120 such that the second screen device 120 may communicate directly with the digital content system 104 and/or the feedback system 102. In an additional implementation, the first screen device 118 may utilize an instance of the digital content system application 116 installed thereon to communicate directly with the digital content system 104 and/or the feedback system 102 via the network 122 while the second screen device 120 may utilize a separate instance of the digital content system application 116 installed thereon to communicate directly with the digital content system 104 and/or the feedback system 102 also via the network 122. In some implementations, the networking environment 100 may not include the digital content receiver 114.

As mentioned above, the digital content receiver 114 (and in some implementations the first screen device 118 and/or the second screen device 120) may be communicatively coupled with the server(s) 112 through the network 122. In one or more implementations, the network 122 may represent any type or form of communication network, such as the Internet, and may include one or more physical connections, such as a LAN, and/or wireless connections, such as a WAN. In some implementations, the network 122 may represent a telecommunications carrier network. In at least one implementation, the network 122 may represent combinations of networks such that the digital content receiver 114 and the first screen device 118 may communicate with the digital content system 104 via a wireless network while the second screen device 120 may communicate with the feedback system 102 via a cellular network.

Although FIG. 1 illustrates components of the exemplary networking environment 100 in one arrangement, other arrangements are possible. For example, in one implementation, the feedback system 102 can operate as a native application that may be installed on the digital content receiver 114, the first screen device 118, and/or the second screen device 120. In another implementation, the feedback system 102 may operate across multiple servers. Moreover, in some implementations, the exemplary networking environment 100 may include multiple second screen devices 120—such as when a multiplayer game is being played on the first screen device 118. Similarly, the exemplary networking environment 100 may also include multiple first screen devices 118 such as when multiple players are playing a video game on separate displays. For example, in that implementation, the feedback system 102 and/or the digital content system 104 can support the same video game being played by multiple players (e.g., on multiple second screen devices and multiple first screen devices) across multiple locations and on different user accounts within the digital content system 104.

In one or more implementations, and as will be explained in greater detail below, the methods and steps performed by the feedback system 102 reference multiple terms. For example, a "digital video game" or "video game" can refer to a digital program that causes game graphics to be rendered on a display device, such as a first screen device as user inputs received via a second screen device manipulate or interact with the rendered game graphics. A video game may include points, places, junctures, levels, characters, and other displayed objects.

As used herein, "video game control elements" can refer to interactive graphics displayed on a display screen device. For example, a video game control element can be an interactive graphic that mimics a button. In some implementations, video game control elements can appear to be depressed or otherwise manipulated when selected. Video game control elements may also be grouped together in compositions. A video game control element may be positioned and scaled within a touch screen display of a display screen device. Additionally, video game control elements can refer to other types of displayed interactive graphics. For example, a video game control element may be specific and customized to a particular video game. To illustrate, a video game control element can include a depiction of an enemy character that, in response to a detected selection on the display screen device, is destroyed within the video game. In another example, video game control elements can include two displayed objects (e.g., a stone and a piece of wood) that can be dragged together on the touch screen display of the display screen device to be combined into a new video game control element (e.g., a tool).

As used herein, a "display screen device" can refer to any device with a touch screen display where video game control elements may be implemented. For example, in one or more implementations, a display screen device can be a second screen device such as a smartphone that has been temporarily converted by the digital content system 104 into a video game controller. Display screen devices can have various characteristics that affect how feedback signatures are executed. For example, a display screen device can have characteristics including, but not limited to a display resolution (i.e., how well the touch screen can display graphics), audio fidelity level (i.e., how well speakers of the display screen device can play sounds), and a vibration motor duration (i.e., how long/how intensely a vibration motor of the display screen device can spin).

As used herein, an "event" can refer to any change associated with the video game 103 and/or the display screen device on which the video game is displayed or played. For example, an event can include an interaction with a video game control element displayed by the display screen device (e.g., when a particular on-screen button has been selected), a change in how video game control elements are displayed by the display screen device, a change in status (e.g., when the battery of the display screen device is low, when the display screen device becomes disconnected from the internet, etc.), and a change in gameplay (e.g., gameplay moving to a new level, gameplay reaching a predetermined point).

As used herein, a "feedback signature" can refer to instructions that cause the display screen device to execute feedback signals in a specified way. For example, a feedback signature can instruct the display screen device to simultaneously execute two feedback signals in a way that is synchronized to audio playback of the video game 103.

As used herein, a "feedback signal" can refer to an instruction that causes the display screen device to perform a specific task. For example, a visual feedback signal can cause the display screen device to display a specific color or graphic. An auditory feedback signal can cause the display screen device to play a specific sound at a particular volume level. A haptic feedback signal can cause the display screen device to vibrate, shake, wobble, etc. at a particular intensity, with a particular pattern, for a particular duration, and so forth.

In one or more implementations, the feedback system 102 can generate feedback signatures within specific categories. For example, as used herein, the "input feedback category" can refer to feedback signatures that are associated with video game control element interaction events. Additionally, as used herein, the "informative feedback category" can refer to feedback signatures that are associated with changes to the display screen device (e.g., battery status, connection status, etc.) and/or the video game 103 about which the player should be informed. Moreover, as used herein, the "immersive feedback category" can refer to video game events that can be made more immersive through additional visual, auditory, and/or haptic feedback given via the display screen device.

As mentioned above, FIG. 2 is a flow diagram of an exemplary computer-implemented method 200 generating and executing a feedback signature associated with a particular event in connection with the video game 103. The steps shown in FIG. 2 may be performed by any suitable computer-executable code and/or computing system, including the system(s) illustrated in FIG. 4. In one example, each of the steps shown in FIG. 2 may represent an algorithm whose structure includes and/or is represented by multiple sub-steps, examples of which will be provided in greater detail below.

As illustrated in FIG. 2, at step 202 the feedback system 102 can generate a feedback signature that conveys, using a specific combination of feedback signals, an occurrence of a particular event in connection with a video game. For example, the feedback system 102 can generate a feedback signature that includes a definition of the particular event (e.g., detecting a selection of a specific video game control element) and one or more feedback signals that should be executed in response to determining that the particular event has occurred. In one or more implementations, the feedback system 102 can generate the feedback signature as a set of instructions that cause the second screen device 120 to execute the one or more feedback signals.

As further illustrated in FIG. 2, at step 204 the feedback system 102 can detect the occurrence of the particular event. For example, the feedback system 102 can detect occurrences of events related to detected selections of video game control elements, occurrences of events related to changes associated with the video game and/or a display screen device, and occurrences of events that can add depth to the experience of playing the video game.

As further illustrated in FIG. 2, at step 206 the feedback system 102 can determine one or more characteristics of a display screen device that functions as a game controller for the video game. For example, the feedback system 102 can determine characteristics of the second screen device 120 such as, but not limited to, a display resolution, a minimum audio fidelity level, and minimum vibration motor capabilities.

As further illustrated in FIG. 2, at step 208 the feedback system 102 can modify, based at least in part on the one or more characteristics of the display screen device, the specific combination of feedback signals to tailor the feedback signature to the display screen device. For example, the feedback system 102 can modify various feedback signals by changing a volume of the feedback signal, a duration of the feedback signal, an intensity of the feedback signal, and so forth. As such, the feedback system 102 can tailor the feedback signal to, and/or guard against instructing the second screen device 120 to execute a feedback signal that is outside of the capabilities of the second screen device 120.

As further shown in FIG. 2, at step 210 the feedback system 102 can cause the display screen device to execute the specific combination of feedback signals included with the tailored feedback signature to convey the occurrence of the particular event. For example, as mentioned above, the feedback system 102 can generate the feedback signature as a set of instructions that causes the second screen device 120 to perform one or more actions. As such, the feedback system 102 can transmit the instructions within the feedback signature—modified to suit the capabilities of the second screen device 120—to the second screen device 120.

As discussed above, the feedback system 102 can generate and implement feedback signatures on the second screen device 120. FIG. 3A illustrates the second screen device 120 being utilized as a video game controller in connection with the video game 103. For example, the second screen device 120 can include a touch screen display 300 that displays a layout of video game control elements 302a, 302b, 302c, 302d, and 302e. In one or more implementations, the feedback system 102 in connection with the video game 103 can receive or detect selections of any of the video game control elements 302a-302e during gameplay. Moreover, the feedback system 102 can detect occurrences of events in connection with the second screen device 120 (e.g., a loss of connectivity, low battery events, etc.).

In one or more implementations, the feedback system 102 can further query and/or receive information from the second screen device 120 that is related to characteristics of the second screen device 120. For example, the feedback system 102 can query or receive information that identifies various characteristics associated with one or more displays of the second screen device 120 (e.g., display type, color gamut, current or minimum/maximum refresh rate, display resolution, brightness level, etc.), one or more audio systems of the second screen device 120 (e.g., the type, number, frequency response, impedance, sensitivity, etc. of one or more loudspeakers, the audio encoding/decoding capabilities of the audio system, etc.), one or more haptics systems of the second screen device 120 (e.g., the number, type, vibration strength, vibration patterns supported, etc.), one or more battery or power delivery systems of the second screen device 120 (e.g., the number, type, capacity, current charge level, etc.), and so forth. In at least one implementation, the feedback system 102 can modify a feedback signature based on any of this information.

In one or more implementations, the feedback system 102 can further modify a feedback signature based on player customizations. For example, as shown in FIG. 3B the feedback system 102 can cause the second screen device 120 to provide customization options in connection with multiple feedback categories. To illustrate, the feedback system 102 can cause the second screen device 120 to provide a configuration menu 304 with customization options under the feedback categories 306a, 306b, 306c, 306d, and 306e. In response to a detected selection of one of the feedback categories 306a-306e, the feedback system 102 can cause the second screen device 120 to provide feedback signal customization options.

For example, in response to a detected selection of the feedback category 306b (e.g., "Haptics"), the feedback system 102 can cause the second screen device 120 to provide the feedback signal customization options 308a, 308b, and 308c. In response to detected selections of one or more of the feedback signal customization options 308a-308c, the second screen device 120 can generate and transmit a feedback signal customization request that corresponds to the selected feedback signal customization options. The feedback system 102 can then modify one or more feedback signatures according to the feedback signal customization request.

The second screen device 120 can generate feedback signal customization requests associated with any combination of selected feedback signal customization options under any feedback category. Moreover, the feedback system 102 can provide feedback signal customization options and feedback categories beyond those illustrated in FIG. 3B. For example, the feedback system 102 can provide feedback signal customizations options related to sound inputs captured by a microphone of the second screen device 120, accelerometer inputs captured by a gyroscope of the second screen device 120, and so forth.

As mentioned above, and as shown in FIG. 4, the feedback system 102 performs various functions in connection with generating and implementing feedback signatures in connection with the video game 103. FIG. 4 is a block diagram 400 of the feedback system 102 operating within the memory 106 of the server(s) 112 while performing these functions. As such, FIG. 4 provides additional detail with regard to these functions. For example, as shown in FIG. 4, the feedback system 102 can include a communication manager 402, an event occurrence manager 404, and a feedback signature manager 406. As further shown in FIG. 4, the additional items 108 can store and maintain digital video game data 408.

In certain implementations, the feedback system 102 may represent one or more software applications, modules, or programs that, when executed by a computing device, may cause the computing device to perform one or more tasks. For example, and as will be described in greater detail below, one or more of the communication manager 402, the event occurrence manager 404, or the feedback signature manager 406 may represent software stored and configured to run on one or more computing devices, such as the server(s) 112. One or more of the communication manager 402, the event occurrence manager 404, and the feedback signature manager 406 of the feedback system 102 shown in FIG. 4 may also represent all or portions of one or more special purpose computers to perform one or more tasks.

As mentioned above, and as shown in FIG. 4, the feedback system 102 can include the communication manager 402. In one or more implementations, the communication manager 402 can receive data from one or more of the digital content receiver 114 and the second screen device 120. For example, the communication manager 402 can receive video game control element data from the second screen device 120 that indicates which video game control elements have been interacted with/selected on a touch screen display (e.g., the touch screen display 300) of the second screen device 120. The communication manager 402 can further transmit data to the one or more of the digital content receiver 114 and the second screen device 120. For example, the communication manager 402 can transmit instructions and other data to the second screen device 120 that causes the second screen device 120 to execute specific combinations of feedback signals included in feedback signatures.

The communication manager 402 can detect user interactions with a fine level of granularity. For example, the communication manager 402 can receive and/or detect tap touch gesture inputs, press-and-hold touch gesture inputs, press-and-slide touch gesture inputs, multi-finger touch gesture inputs, variable pressure touch gesture inputs, sound inputs, or gyroscopic inputs. In one or more implementations, the communication manager 402 can receive and/or detect such control inputs relative to specific video game control elements displayed by the second screen device 120. Additionally, the communication manager 402 can receive and/or detect timing information associated with the control inputs that indicates how quickly video game control elements are selected, the pressure with which video game control elements are selected, a sequence in which video game controls are selected, and so forth.

Additionally, the communication manager 402 can request and/or receive characteristic data from the second screen device 120. For example, the communication manager 402 can request and/or receive characteristic information from the second screen device 120 that indicates a display resolution of the second screen device 120, a minimum audio fidelity level of the second screen device 120, or a minimum vibration motor duration of the second screen device 120, a current battery power level of the second screen device 120, a current network connection strength of the second screen device 120, a muted status of the second screen device 120, whether the second screen device 120 is receiving an incoming phone call, and so forth. In one or more implementations, the communication manager 402 can provide this information to the feedback signature manager 406 for use in modifying one or more feedback signatures, as discussed below.

As further shown in FIG. 4, the feedback system 102 can include the event occurrence manager 404. In one or more implementations, the event occurrence manager 404 can detect occurrences of events and determine whether a detected event occurrence corresponds to a generated feedback signature. For example, the event occurrence manager 404 can access information received by the communication manager 402 as well as information from the video game 103 to determine whether an event has occurred.

To illustrate, the event occurrence manager 404 can receive information in connection with user inputs and user selections detected via the touch screen display 300 of the second screen device 120. The event occurrence manager 404 can also receive information that is based on changes to the second screen device 120 (e.g., a video game control element layout change on the touch screen display 300). The event occurrence manager 404 can further receive information that indicates that a change has happened relative to the video game 103 (e.g., the player has achieved a new badge, has reached a new level, has gained a new weapon) or that a predetermined point in gameplay has been reached (e.g., a particular character has been encountered, a particular object has been selected).

From any of this information, the event occurrence manager 404 can detect occurrences of various types of events. For example, the event occurrence manager 404 can detect occurrences of input events, informative events, and immersive events. To illustrate, the event occurrence manager 404 can detect input events including, but not limited to, selections of primary video game control elements (e.g., A/B/X/Y buttons), selections of other video game control elements (e.g., shoulder buttons, a pause button), selections of video game control elements associated with the digital content system 104, selections of press-and-hold or slide-and-hold video game control elements (e.g., moving a joystick, reaching a limit of the joystick), selection of a swipe video game control element, and so forth. Moreover, in one or more implementations, the event occurrence manager 404 can detect occurrences of other types of events relative to the second screen device 120. For example, the event occurrence manager 404 can detect occurrences of input events including voice input through a microphone of the second screen device 120 and gyroscopic input from an accelerometer of the second screen device 120.

Additionally, the event occurrence manager 404 can detect occurrences of informative events. For example, the event occurrence manager 404 can detect informative events including, but not limited to, the second screen device 120 connecting and/or disconnecting from the server(s) 112 (e.g., gaining or losing network connectivity), the video game 103 being loaded or exited, and a video game control element layout change on the touch screen display 300 of the second screen device 120. Moreover, the event occurrence manager 404 can detect immersive events including, but not limited to, a video game character receiving a hit, a scene change in the video game 103 (e.g., an explosion, moving to a new room), a video game character receiving a power-up, and so forth. In one or more implementations, the event occurrence manager 404 can utilize rules, databases, decision trees, machine learning techniques, and other algorithms in determining whether an event has occurred based on the received information.

In response to detecting an occurrence of an event, the event occurrence manager 404 can determine if a generated feedback signature corresponds to the detected event. For example, the event occurrence manager 404 can compare descriptions, titles, and other metadata associated with a repository of feedback signatures (e.g., stored in the digital video game data 408) to identify a match to a detected event. In some implementations, the event occurrence manager 404 can utilize fuzzy logic, machine learning, and other artificial intelligence techniques to determine that a detected event corresponds with a particular feedback signature with more than a threshold level of confidence.

As shown in FIG. 4, and as mentioned above, the feedback system 102 can include the feedback signature manager 406. In one or more implementations, the feedback signature manager 406 can generate feedback signatures. For example, the feedback signature manager 406 can generate a feedback signature that includes one or more feedback signals. The one or more feedback signals can be associated with one or more types of feedback signals. To illustrate, feedback signals may be visual feedback signals that can cause a visual change to the second screen device 120, auditory feedback signals that make a sound via the second screen device 120 and/or the first screen device 118, or haptics feedback signal that cause the second screen device 120 to move or vibrate in a way that can be felt by the player.

In one or more implementations, the feedback signature manager 406 can generate feedback signatures in any of various categories. For example, the feedback signature manager 406 can generate feedback signatures within an input feedback category, an informative feedback category, or an immersive feedback category. To illustrate, the feedback signature manager 406 can generate feedback signatures in the input feedback category that include feedback signals that react to detected user inputs and/or selections via the touch screen display 300 of the second screen device 120. For instance, the feedback signature manager 406 can generate a feedback signature in the input feedback category including feedback signals that can cause the second screen device 120 to give a slight vibration and play a subtle sound each time there is a detected selection of a particular video game control element (e.g., a displayed button).

Additionally, the feedback signature manager 406 can generate feedback signatures in the informative feedback category that include feedback signals that inform a player of a particular change—without requiring that the player focus their attention on the second screen device 120. For example, the feedback signature manager 406 can generate a feedback signature in the informative feedback category including feedback signals that can cause the second screen device 120 to vibrate and play a sound in response to the second screen device 120 losing network connectivity. In another example, the feedback signature manager 406 can generate a feedback signature in the informative feedback category including feedback signals that can cause the pixels of the touch screen display 300 on the second screen device 120 to briefly flash a single color (e.g., at a brightness level that the player can notice in their peripheral vision) in response to the layout of video game control elements on the touch screen display 300 changing.

Moreover, the feedback signature manager 406 can generate feedback signatures in the immersive feedback category that include feedback signals that help a player feel more immersed in the video game 103. For example, the feedback signature manager 406 can generate a feedback signature in the immersive feedback category that includes feedback signals that can cause the second screen device 120 to vibrate when a player's video game character receives damage.

In some implementations, the feedback signature manager 406 can generate feedback signatures that reflect nuanced levels of feedback relative to each of the categories discussed above. For example, the feedback signature manager 406 can generate feedback signatures in the input feedback category that include haptic feedback signals (e.g., vibrations) that are all similar but different enough that a player can distinguish—by touch alone—which video game control element they have selected. To illustrate, the feedback signature manager 406 can generate feedback signatures that include feedback signals that cause the second screen device 120 to vibrate for a specific duration. The feedback signature manager 406 can further add nuance to these feedback signatures by modifying the feedback signals to cause the second screen device 120 to vibrate at different intensity levels and/or using different vibration patterns depending on the video game control element that has been selected. The feedback signature manager 406 can generate feedback signatures in different categories such that no other category of feedback signatures includes feedback signals that cause the second screen device 120 to vibrate for the duration that is specific to the input feedback category of feedback signatures.

The feedback signature manager 406 can further add additional variations between the combinations of feedback signals associated with feedback signatures in the same feedback category such that, for example, selecting an "A" button may feel slightly different than when the player selects a "B" button. But selecting any button on the touch screen display 300 of the second screen device 120 may be a different feedback experience than when the second screen device 120 loses network connectivity (e.g., indicated by a color flashing on the touch screen display 300 and/or a different pattern or intensity of vibrations). In this way, the feedback signature manager 406 can assist the player to intuit (e.g., without having to look at or focus on the second screen device 120) that certain combinations of similar feedback signals are associated with certain events within a particular feedback category while other combinations of feedback signals are associated with events in a different feedback category altogether.

In response to detected occurrences of a particular event (e.g., detected by the event occurrence manager 404 discussed above), the feedback signature manager 406 can modify a feedback signature based on one or more characteristics of the second screen device 120. For example, in response to determining that a minimum vibration motor duration of the second screen device 120 is greater than a duration indicated by a haptic feedback signal included in the feedback signature, the feedback signature manager 406 can modify that haptic duration to match the minimum vibration motor duration of the second screen device 120. In another example, the feedback signature manager 406 can modify a visual feedback signal that causes all of the pixels in the touch screen display 300 to flash a particular color at a particular intensity in response to determining that the display resolution of the second screen device 120 is not capable of executing that visual feedback signal. In yet another example, the feedback signature manager 406 can modify an auditory feedback signal in the feedback signature in response to determining that the minimum audio fidelity level of the second screen device 120 is not compatible with that auditory feedback signal.

In one or more implementations, the feedback signature manager 406 can also modify a feedback signature in response to a feedback signal customization request. For example, as discussed above with reference to FIG. 3B, the feedback system 102 can enable a player to configure a feedback signal customization request that can indicate whether the player wants to feel certain vibrations, hear certain sounds, see certain colors, etc. in connection with the second screen device 120. As such, the feedback signature manager 406 can modify a feedback signature to add, remove, or change certain feedback signals such that the feedback signals are in-line with the received feedback signal customization request.

In at least one implementation, the feedback signature manager 406 can prioritize execution of feedback signatures. For example, it is possible that multiple event occurrences are detected at the same time or within a threshold amount of time from each other. To illustrate, an explosion may happen during gameplay of the video game 103 at the same time that the second screen device 120 experiences a network connectivity failure. As such, the feedback system 102 may try to cause two feedback signatures to execute on the second screen device 120 at the same time. This, however, may be confusing for the player as multiple haptic feedback signals, auditory feedback signals, and visual feedback signals may execute at the same time.

As such, the feedback signature manager 406 can prioritize the execution of the feedback signatures such that the feedback signals execute in a particular order or such that certain feedback signals are omitted. In at least one implementation, the feedback signature manager 406 may prioritize feedback signatures in the immersive feedback category below other feedback signatures in the input feedback category and/or the informative feedback category. Moreover, in at least one implementation, the feedback signature manager 406 may prioritize feedback signatures in the informative feedback category over feedback signatures in all other feedback categories. In one or more implementations, the feedback signature manager 406 may enable the prioritization of feedback categories to be customizable such that prioritization information can be received as part of a feedback signal customization request.

In one or more implementations, the feedback signature manager 406 can configure, compile, or otherwise package a modified feedback signature in a way that causes the second screen device 120 to execute the feedback signals included in that feedback signature. For example, the feedback signature manager 406 can configure a feedback signature such that the second screen device 120 synchronizes execution the feedback signals with one or more of the game graphics being shown on the first screen device 118 and with audio that is playing on the second screen device 120 and/or the first screen device 118.

As shown in FIGS. 1 and 4, the server(s) 112 and the digital content receiver 114 can include one or more physical processors, such as the physical processor 110. The physical processor 110 can generally represent any type or form of hardware-implemented processing unit capable of interpreting and/or executing computer-readable instructions. In one implementation, the physical processor 110 may access and/or modify one or more of the components of the feedback system 102. Examples of physical processors include, without limitation, microprocessors, microcontrollers, Central Processing Units (CPUs), Field-Programmable Gate Arrays (FPGAs) that implement softcore processors, Application-Specific Integrated Circuits (ASICs), portions of one or more of the same, variations or combinations of one or more of the same, and/or any other suitable physical processor.

Additionally, the server(s) 112 and the digital content receiver 114 can include the memory 106. In one or more implementations, the memory 106 generally represents any type or form of volatile or non-volatile storage device or medium capable of storing data and/or computer-readable instructions. In one example, the memory 106 may store, load, and/or maintain one or more of the components of the feedback system 102. Examples of the memory 106 can include, without limitation, Random Access Memory (RAM), Read Only Memory (ROM), flash memory, Hard Disk Drives (HDDs), Solid-State Drives (SSDs), optical disk drives, caches, variations or combinations of one or more of the same, and/or any other suitable storage memory.

Moreover, as shown in FIG. 4, the server(s) 112 and the digital content receiver 114 can include the additional items 108. On the server(s) 112, the additional items 108 can include the digital video game data 408. In one or more implementations, the digital video game data 408 can include the video game 103 along with the video game control element information associated with the video game 103. The digital video game data 408 can also include information, machine learning models, and other data used in determining whether an event has occurred. Furthermore, the digital video game data 408 can also include generated feedback signatures that—when executed—convey the occurrence of particular events via the second screen device 120.

In summary, the feedback system 102 can generate and implement feedback signatures that—when executed by the second screen device 120—can provide information to a video game player in a way that does not draw the player's attention away from game play. For example, the feedback system 102 can generate a feedback signature that conveys the occurrence of a particular event. When the particular event actually occurs, the feedback system 102 can cause the second screen device 120 to execute the combination of feedback signals included in the feedback signature. The feedback signals can cause the second screen device 120 to display colors or images, play sounds, shake or vibrate, and so forth. In at least one implementation, the feedback system 102 can modify feedback signatures in a way that is specific to characteristics of the second screen device 120 such that the execution of the associated feedback signal is tailored to the capabilities of the second screen device 120.

EXAMPLE EMBODIMENTS

Example 1: A computer-implemented method for generating and causing the execution of feedback signatures in connection with a video game. For example, the method may include generating a feedback signature that conveys, using a specific combination of feedback signals, an occurrence of a particular event in connection with a video game, detecting the occurrence of the particular event, determining one or more characteristics of a display screen device that functions as a game controller for the video game, modifying, based at least in part on the one or more characteristics of the display screen device, the specific combination of feedback signals to tailor the feedback signature to the display screen device, and causing the display screen device to execute the specific combination of feedback signals included with the tailored feedback signature to convey the occurrence of the particular event.

Example 2: The computer-implemented method of Example 1, wherein the specific combination of feedback signals includes at least one of visual feedback signals, auditory feedback signals, or haptics feedback signals.

Example 3: The computer-implemented method of any of Examples 1 and 2, wherein the one or more characteristics of the display screen device include at least one of a display resolution of the display screen device, a minimum audio fidelity level of the display screen device, or a minimum vibration motor duration of the display screen device.

Example 4: The computer-implemented method of any of Examples 1-3, wherein tailoring the feedback signature to the display screen device includes at least one of modifying visual feedback signals in the feedback signature based on the display resolution of the display screen device, modifying auditory feedback signals in the feedback signature based on the minimum audio fidelity level of the display screen device, or modifying haptics feedback signals in the feedback signature based on the minimum vibration motor duration of the display screen device.

Example 5: The computer-implemented method of any of Examples 1-4, wherein the specific combination of feedback signals is associated with at least one of an input feedback category, an informative feedback category, or an immersive feedback category.

Example 6: The computer-implemented method of any of Examples 1-5, further including causing the display screen device to prioritize execution of the specific combination of feedback signals based on an associated feedback category.

Example 7: The computer-implemented method of any of Examples 1-6, wherein the specific combination of feedback signals includes one or more differences from combinations of feedback signals used by other feedback signatures in a same feedback category such that a player can distinguish between events in the same feedback category without having to focus on the display screen device.

Example 8: The computer-implemented method of any of Examples 1-7, further including receiving at least one feedback signal customization request, wherein modifying the specific combination of feedback signals includes modifying the specific combination of feedback signals based at least in part on the at least one feedback signal customization request.

In some examples, a system may include at least one processor and a physical memory including computer-executable instructions that, when executed by the at least one processor, cause the at least one processor to perform various acts. For example, the computer-executable instructions may cause the at least one processor to perform acts including generating a feedback signature that conveys, using a specific combination of feedback signals, an occurrence of a particular event in connection with a video game, detecting the occurrence of the particular event, determining one or more characteristics of a display screen device that functions as a game controller for the video game, modifying, based at least in part on the one or more characteristics of the display screen device, the specific combination of feedback signals to tailor the feedback signature to the display screen device, and causing the display screen device to execute the specific combination of feedback signals included with the tailored feedback signature to convey the occurrence of the particular event.

Additionally in some examples, a non-transitory computer-readable medium can include one or more computer-executable instructions that, when executed by at least one processor of a computing device, cause the computing device to perform various acts. For example, the one or more computer-executable instructions may cause the computing device to generate a feedback signature that conveys, using a specific combination of feedback signals, an occurrence of a particular event in connection with a video game, detect the occurrence of the particular event, determine one or more characteristics of a display screen device that functions as a game controller for the video game, modify, based at least in part on the one or more characteristics of the display screen device, the specific combination of feedback signals to tailor the feedback signature to the display screen device, and cause the display screen device to execute the specific combination of feedback signals included with the tailored feedback signature to convey the occurrence of the particular event.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of," Finally, for ease of use, the terms "including" and "having" (and their derivatives), as used in the specification and claims, are interchangeable with and have the same meaning as the word "comprising."

What is claimed is:

1. A computer-implemented method comprising:
    generating a feedback signature that conveys, using a specific combination of feedback signals, an occurrence of a particular event in connection with a video game controlled by a display screen device that functions as a video game controller;
    detecting, by a server involved in providing the video game in connection with the display screen device, the occurrence of the particular event;
    querying, by the server, the display screen device for one or more characteristics of the display device;
    determining, by the server, the one or more characteristics of the display screen device based at least in part on the query;
    modifying, by the server, the specific combination of feedback signals to tailor the feedback signature to the display screen device based at least in part on the one or more characteristics of the display screen device; and
    causing, by the server, the display screen device to execute the specific combination of feedback signals included with the tailored feedback signature to convey the occurrence of the particular event.

2. The computer-implemented method of claim 1, wherein the specific combination of feedback signals comprises at least one of visual feedback signals, auditory feedback signals, or haptics feedback signals.

3. The computer-implemented method of claim 2, wherein the one or more characteristics of the display screen device comprise at least one of a display resolution of the display screen device, a minimum audio fidelity level of the display screen device, or a minimum vibration motor duration of the display screen device.

4. The computer-implemented method of claim 3, wherein tailoring the feedback signature to the display screen device comprises at least one of:
    modifying visual feedback signals in the feedback signature based on the display resolution of the display screen device;
    modifying auditory feedback signals in the feedback signature based on the minimum audio fidelity level of the display screen device; or
    modifying haptics feedback signals in the feedback signature based on the minimum vibration motor duration of the display screen device.

5. The computer-implemented method of claim 1, wherein the specific combination of feedback signals is associated with at least one of an input feedback category, an informative feedback category, or an immersive feedback category.

6. The computer-implemented method of claim 5, further comprising causing the display screen device to prioritize execution of the specific combination of feedback signals based on an associated feedback category.

7. The computer-implemented method of claim 5, wherein the specific combination of feedback signals includes one or more differences from combinations of feedback signals used by other feedback signatures in a same feedback category such that a player can distinguish between events in the same feedback category without having to focus on the display screen device.

8. The computer-implemented method of claim 1, further comprising receiving at least one feedback signal customization request;
    wherein modifying the specific combination of feedback signals comprises modifying the specific combination of feedback signals based at least in part on the at least one feedback signal customization request.

9. A system comprising:
at least one physical processor incorporated in a server involved in providing a video game controlled by a display screen device that functions as a video game controller; and
physical memory that is incorporated in the server and comprises computer-executable instructions that, when executed by the at least one physical processor, cause the server to perform acts comprising:
generating a feedback signature that conveys, using a specific combination of feedback signals, an occurrence of a particular event in connection with the video game;
detecting the occurrence of the particular event;
querying the display screen device for one or more characteristics of the display device;
determining the one or more characteristics of the display screen device based at least in part on the query;
modifying, based at least in part on the one or more characteristics of the display screen device, the specific combination of feedback signals to tailor the feedback signature to the display screen device; and
causing the display screen device to execute the specific combination of feedback signals included with the tailored feedback signature to convey the occurrence of the particular event.

10. The system of claim 9, wherein the specific combination of feedback signals comprises at least one of visual feedback signals, auditory feedback signals, or haptics feedback signals.

11. The system of claim 10, wherein the one or more characteristics of the display screen device comprise at least one of a display resolution of the display screen device, a minimum audio fidelity level of the display screen device, or a minimum vibration motor duration of the display screen device.

12. The system of claim 11, wherein tailoring the feedback signature to the display screen device comprises at least one of:
modifying visual feedback signals in the feedback signature based on the display resolution of the display screen device;
modifying auditory feedback signals in the feedback signature based on the minimum audio fidelity level of the display screen device; or
modifying haptics feedback signals in the feedback signature based on the minimum vibration motor duration of the display screen device.

13. The system of claim 9, wherein the specific combination of feedback signals is associated with at least one of an input feedback category, an informative feedback category, or an immersive feedback category.

14. The system of claim 13, further comprising computer-executable instructions that, when executed by the at least one physical processor, cause the at least one physical processor to perform an act comprising causing the display screen device to prioritize execution of the specific combination of feedback signals based on an associated feedback category.

15. The system of claim 13, wherein the specific combination of feedback signals includes one or more differences from combinations of feedback signals used by other feedback signatures in a same feedback category such that a player can distinguish between events in the same feedback category without having to focus on the display screen device.

16. The system of claim 9, further comprising computer-executable instructions that, when executed by the at least one physical processor, cause the at least one physical processor to perform an act comprising receiving at least one feedback signal customization request;
wherein modifying the specific combination of feedback signals comprises modifying the specific combination of feedback signals based at least in part on the at least one feedback signal customization request.

17. A non-transitory computer-readable medium comprising one or more computer-executable instructions that, when executed by at least one processor of a server involved in providing a video game controlled by a display screen device that functions as a video game controller, cause the server to:
generate a feedback signature that conveys, using a specific combination of feedback signals, an occurrence of a particular event in connection with a video game controlled by a display screen device that functions as a video game controller;
detect the occurrence of the particular event;
query the display screen device for one or more characteristics of the display device;
determine the one or more characteristics of the display screen device based at least in part on the query;
modify, based at least in part on the one or more characteristics of the display screen device, the specific combination of feedback signals to tailor the feedback signature to the display screen device; and
cause the display screen device to execute the specific combination of feedback signals included with the tailored feedback signature to convey the occurrence of the particular event.

18. The non-transitory computer-readable medium of claim 17, wherein the specific combination of feedback signals comprises at least one of visual feedback signals, auditory feedback signals, or haptics feedback signals.

19. The non-transitory computer-readable medium of claim 18, wherein the one or more characteristics of the display screen device comprise at least one of a display resolution of the display screen device, a minimum audio fidelity level of the display screen device, or a minimum vibration motor duration of the display screen device.

20. The non-transitory computer-readable medium of claim 19, wherein tailoring the feedback signature to the display screen device comprises at least one of:
modifying visual feedback signals in the feedback signature based on the display resolution of the display screen device;
modifying auditory feedback signals in the feedback signature based on the minimum audio fidelity level of the display screen device; or
modifying haptics feedback signals in the feedback signature based on the minimum vibration motor duration of the display screen device.

* * * * *